US008462709B2

(12) United States Patent
Nanda et al.

(10) Patent No.: US 8,462,709 B2
(45) Date of Patent: Jun. 11, 2013

(54) MULTIPLE FREQUENCY BAND OPERATION IN WIRELESS NETWORKS

(75) Inventors: Sanjiv Nanda, San Diego, CA (US); Shravan K. Surineni, San Diego, CA (US); J. Rodney Walton, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 12/507,850

(22) Filed: Jul. 23, 2009

(65) Prior Publication Data

US 2009/0285116 A1    Nov. 19, 2009

Related U.S. Application Data

(62) Division of application No. 11/253,358, filed on Oct. 18, 2005.

(60) Provisional application No. 60/620,488, filed on Oct. 20, 2004.

(51) Int. Cl.
*H04W 4/00*    (2009.01)

(52) U.S. Cl.
USPC ............................ 370/329; 370/431; 370/341

(58) Field of Classification Search
USPC .......................................... 370/329, 341, 431
See application file for complete search history.

(56) References Cited

U.S. PATENT DOCUMENTS 4,395,931 A * 8/1983 Wachi .............................. 84/603
5,038,399 A * 8/1991 Bruckert ....................... 455/447
5,710,973 A    1/1998 Yamada et al.
5,828,660 A    10/1998 Baum et al.
5,909,436 A * 6/1999 Engstrom et al. .............. 370/343
5,937,377 A * 8/1999 Hardiman et al. ............. 704/225

(Continued)

FOREIGN PATENT DOCUMENTS

DE          19651709        6/1998
EP          1096730 A1      5/2001

(Continued)

OTHER PUBLICATIONS

International Search Report—PCT/US2005/038079, International Search Authority—European Patent Office—Jun. 19, 2006.

(Continued)

*Primary Examiner* — Phuc Tran
(74) *Attorney, Agent, or Firm* — QUALCOMM Patent Group; James Hunt Yancey, Jr

(57) ABSTRACT

Embodiments for bandwidth allocation methods, detecting interference with other systems, and/or redeploying in alternate bandwidth are described. Higher bandwidth channels may be deployed at channel boundaries (410), which are a subset of those for lower bandwidth channels (310), and may be restricted from overlapping. Interference may be detected (930) on primary, secondary, or a combination of channels, and may be detected in response to energy measurements (910) of the various channels. When interference is detected, a higher bandwidth Basic Service Set (BSS)(100) may be relocated to an alternate channel, or may have its bandwidth reduced to avoid interference. Interference may be detected based on energy measured on the primary or secondary channel, and/or a difference between the two. An FFT (1010) may be used in energy measurement in either or both of the primary and secondary channels. Stations may also monitor messages from alternate systems to make channel allocation decisions. Various other aspects are also presented.

14 Claims, 9 Drawing Sheets

U.S. PATENT DOCUMENTS

| | | | |
|---|---|---|---|
| 6,061,405 | A | 5/2000 | Emami |
| 6,377,552 | B1 * | 4/2002 | Moran et al. ............... 370/241 |
| 6,445,693 | B1 * | 9/2002 | Sarraf et al. ............... 370/343 |
| 6,885,694 | B1 * | 4/2005 | He et al. ............... 375/144 |
| 6,894,996 | B2 * | 5/2005 | Lee ............... 370/337 |
| 7,010,117 | B2 * | 3/2006 | Schulz ............... 379/386 |
| 7,065,144 | B2 | 6/2006 | Walton et al. |
| 7,072,315 | B1 * | 7/2006 | Liu et al. ............... 370/329 |
| 7,072,413 | B2 | 7/2006 | Walton et al. |
| 7,106,781 | B2 | 9/2006 | Agee et al. |
| 7,146,176 | B2 | 12/2006 | McHenry |
| 7,408,907 | B2 | 8/2008 | Diener |
| 7,545,732 | B2 * | 6/2009 | Oh et al. ............... 370/206 |
| 7,983,298 | B2 | 7/2011 | Nanda et al. |
| 2003/0125068 | A1 * | 7/2003 | Lee et al. ............... 455/522 |
| 2004/0106436 | A1 | 6/2004 | Ochi et al. |
| 2004/0142696 | A1 | 7/2004 | Saunders et al. |
| 2004/0264425 | A1 * | 12/2004 | Nishikawa ............... 370/338 |
| 2005/0135318 | A1 | 6/2005 | Walton et al. |
| 2005/0186986 | A1 | 8/2005 | Hansen et al. |
| 2005/0282551 | A1 | 12/2005 | Tandai et al. |
| 2006/0067443 | A1 | 3/2006 | Liu et al. |
| 2011/0299417 | A1 | 12/2011 | Nanda et al. |

FOREIGN PATENT DOCUMENTS

| | | |
|---|---|---|
| EP | 1343339 A2 | 9/2003 |
| JP | 2260719 A | 10/1990 |
| JP | 2003101506 | 4/2003 |
| JP | 2004180038 A | 6/2004 |
| JP | 2006005672 | 1/2006 |
| KR | 20010013849 A | 2/2001 |
| KR | 20010074771 | 8/2001 |
| KR | 1020030007481 | 1/2003 |
| RU | 2175466 | 10/2001 |
| WO | WO9826516 | 6/1998 |
| WO | WO0007302 A1 | 2/2000 |
| WO | WO0176110 A2 | 10/2001 |
| WO | WO2004054280 A2 | 6/2004 |

OTHER PUBLICATIONS

Written Opinion—PCT/US2005/038079, International Search Authority—European Patent Office—Jun. 19, 2006.

European Search Report—EP12168290—Search Authority—Munich—Jun. 14, 2012.

* cited by examiner

MULTIPLE FREQUENCY BAND OPERATION IN WIRELESS NETWORKS

CLAIM OF PRIORITY UNDER 35 U.S.C. §120

The present Application for Patent is a Divisional and claims priority to patent application Ser. No. 11/253,358 entitled "Multiple Frequency Band Operation In Wireless Networks" filed Oct. 18, 2005, and Provisional Application No. 60/620,488 entitled "Method and Apparatus for Multiple Frequency Band Operation In Wireless Networks" filed Oct. 20, 2004, assigned to the assignee hereof and hereby expressly incorporated by reference herein.

BACKGROUND

1. Field

The present disclosure relates generally to wireless communications, and amongst other things to multiple frequency band operation.

2. Background

Wireless communication systems are widely deployed to provide various types of communication such as voice and data A typical wireless data system, or network, provides multiple users access to one or more shared resources. A system may use a variety of multiple access techniques such as Frequency Division Multiplexing (FDM), Time Division Multiplexing (TDM), Code Division Multiplexing (CDM), and others.

Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Other examples of wireless systems include Wireless Local Area Networks (WLANs) such as the IEEE 802.11 standards (i.e. 802.11 (a), (b), or (g)). Improvements over these networks may be achieved in deploying a Multiple Input Multiple Output (MIMO) WLAN comprising Orthogonal Frequency Division Multiplexing (OFDM) modulation techniques. IEEE 802.11(e) has been introduced to improve upon some of the shortcomings of previous 802.11 standards.

Networks such as the 802.11 networks operate using one of several pre-defined channels within unlicensed spectrum. Alternate networks may be deployed within the same spectrum that achieve higher throughput by using higher bandwidth channels. A network may use a frequency allocation that comprises one or more of legacy pre-defined channels. Such networks, if deployed in the same spectrum as legacy systems, may need to avoid interference with or interoperate with legacy systems. It is desirable to deploy networks so as to more efficiently use the available spectrum. There is therefore a need in the art for bandwidth allocation methods for efficient use of the shared spectrum, for detecting interference or collisions with other systems, and/or redeploying in alternate bandwidth when interference is detected.

SUMMARY

Embodiments disclosed herein address the need in the art for multiple frequency band operation in wireless networks.

In several aspects, an apparatus comprises a memory and a processor coupled with the memory. The processor configured to select a channel for establishing at a selected channel bandwidth from at least a first channel bandwidth and a second channel bandwidth and a selected channel boundary from a plurality of first channel boundaries when the first channel bandwidth is selected and from a plurality of second channel boundaries when the second channel bandwidth is selected, wherein the second channel boundaries are a subset of the first channel boundaries and each of the plurality of second channel boundaries are separated from the remainder of the plurality of second channel boundaries by at least the second channel bandwidth.

In additional aspects, a Carrier Sense Multiple Access/Collision Avoidance system that supports transmission on a shared channel comprising at least a primary channel and a secondary channel includes a method comprising measuring energy of the primary channel, measuring energy of the secondary channel, and determining interference in accordance with the measured energy of the primary channel and the measured energy of the secondary channel.

In further aspects, a Carrier Sense Multiple Access/Collision Avoidance system that supports transmission on a shared channel comprising at least a primary channel and a secondary channel includes a method comprising detecting interference on the primary or secondary channel of a first shared channel, reducing the bandwidth of the first shared channel to the bandwidth of the primary channel when interference is detected on the secondary channel, and reducing the bandwidth of the first shared channel to the bandwidth of the secondary channel when interference is detected on the primary channel.

DETAILED DESCRIPTION

Figure 1:
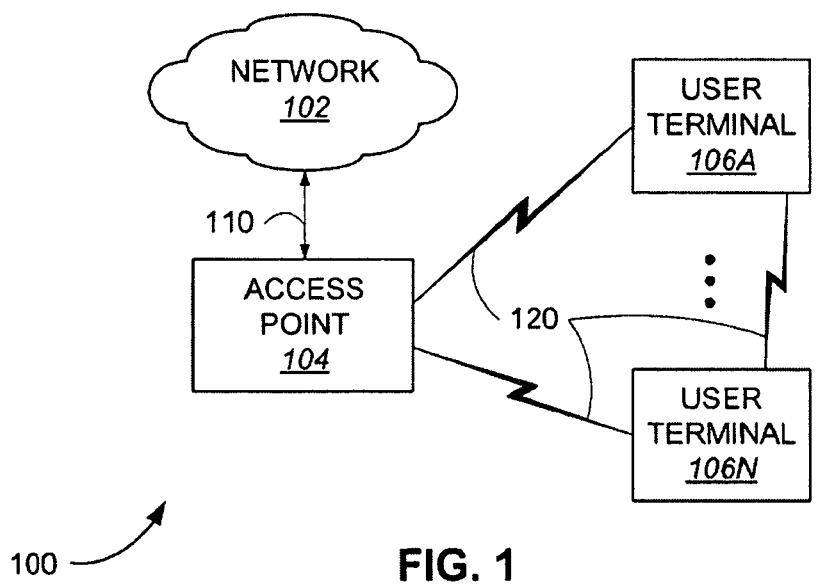
FIG. 1 is a general block diagram of a wireless communication system capable of supporting a number of users.

Various aspects will be detailed below, one or more of which may be combined in any given embodiment. In aspects, a system is deployed to operate in one of two carrier modes: 20 or 40 MHz. Various other embodiments may use alternate parameters for the bandwidth selection, and may use more than two frequency bands to form wider channels and achieve higher throughput. This aspects is designed to interoperate efficiently with legacy 802.11 systems, which operate on one of a plurality of 20 MHz channels. As used herein, the term "high throughput" or "HT" may be used to distinguish systems or stations (STAs) operating in accordance with a next generation standard, such as a multiple frequency band system described herein. The term "legacy" may be used to identify other systems with which interference is to be avoided. Those of skill in the art will recognize that other systems besides legacy systems may also operate within the spectrum of interest, and it will be clear that the aspects described herein are compatible with such systems as well. In this example, a selection of enabling features for simple and effective 20/40 MHz operation are as follows.

In one aspect, 40 MHz carriers comprise even-odd pairs of carriers. Thus 20 MHz carriers are paired as follows: ($2n$, $2n+1$), where n is chosen to select two contiguous legacy carriers. A 40 MHz Basic Service Set (BSS), in this embodiment, does not pair two 20 MHz carriers of the form ($2n+1$, $2n+2$). This ensures that, in these aspects, overlapping 40 MHz BSS (if they exist) have the same primary ($2n$) and secondary ($2n+1$) carriers. The allocation efficiency of this aspect is detailed further below.

In another aspect, procedures may be designed to disallow the establishment of a 40 MHz BSS overlapping with different 20 MHz BSSs on the two 20 MHz carriers. Because medium access procedures to coordinate medium access activity across the two 20 MHz carriers to enable 40 MHz operation may be undesirably complicated and wasteful, when this situation arises, the 40 MHz BSS falls back to 20 MHz. In alternate embodiments, this limitation need not be introduced.

In another aspect, in an example BSS with mixed 40 MHz and 20 MHz (HT or legacy) STAs, medium access is managed on the primary carrier ($2n$). For 40 MHz transmissions, Clear Channel Assessment (CCA) may be performed on the secondary carrier ($2n+1$). In one embodiment, when the shared medium is detected to be busy on the secondary carrier, the STA only transmits on the primary carrier.

In another aspect, monitoring of the secondary carrier is performed. For example, during reception of 20 MHz transmissions, as well as during back-off, STAs may perform CCA on the secondary carrier. Signal to Noise Ratio (SNR) degradation and/or other interference events on the secondary carrier may be determined and reported. Examples of such monitoring are detailed further below.

Various other aspects and embodiments are also described below.

Aspects are disclosed herein that support, among other aspects, highly efficient operation in conjunction with very high bit rate physical layers for a wireless LAN (or similar applications that use newly emerging transmission technologies). The example WLAN is operable in two frequency band modes, 20 MHz and 40 MHz. It supports bit rates in excess of 100 Mbps (million bits per second) including up to 300 Mbps in bandwidths of 20 MHz, and up to 600 Mbps in bandwidths of 40 MHz. Various alternate WLANs are also supported, including those with more than two frequency band modes, and any number of supported bit rates.

Various aspects preserve the simplicity and robustness of the distributed coordination operation of legacy WLAN systems, examples of which are found in 802.11 (a-e). The advantages of the various embodiments may be achieved while maintaining backward compatibility with such legacy systems. (Note that, in the description below, 802.11 systems may be described as example legacy systems. Those of skill in the art will recognize that the improvements are also compatible with alternate systems and standards.)

For 802.11n, backward compatible PPDU types are introduced. In aspects, extended SIGNAL fields are introduced in the legacy PLCP Header to be backward compatible with the SIGNAL field of legacy 802.11. Unused values of the RATE field in the legacy SIGNAL field are set to define new PPDU types. Other schemes may be used to indicate the presence of new PPDU types. This example high throughput system is disclosed in related co-pending U.S. patent application Ser. No. 10/964,330, entitled "HIGH SPEED MEDIA ACCESS CONTROL WITH LEGACY SYSTEM INTEROPERABILITY", filed Oct. 13, 2004, assigned to the assignee of the present disclosure and incorporated by reference herein (hereinafter the '330 application).

In the '330 application, several new PPDU types are introduced. For backward compatibility with legacy STAs, the RATE field in the SIGNAL field of the PLCP Header is modified to a RATE/Type field. Unused values of RATE are designated as PPDU Type. The PPDU Type also indicates the presence and length of a SIGNAL field extension designated SIGNAL2. Other schemes may be used to indicate the presence and length of the SIGNAL field extension. The preamble, SIGNAL field, SIGNAL field extension and additional training are referred to as the extended preamble.

In aspects, during 40 MHz transmissions, the extended preamble including legacy preamble, legacy SIGNAL field and the HT SIGNAL field (i.e. SIGNAL2) and training are transmitted on both the primary and secondary carriers.

One or more exemplary embodiments described herein are set forth in the context of a wireless data communication system. While use within this context is advantageous, different embodiments of the disclosure may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. Method steps can be interchanged without departing from the scope of the present disclosure. The word "exemplary" is used herein to mean "serving as an example, instance, or illustration." Any embodiment described herein as "exemplary" is not necessarily to be construed as preferred or advantageous over other embodiments.

FIG. 1 illustrates exemplary embodiments of system 100, comprising an Access Point (AP) 104 connected to one or more User Terminals (UTs) 106A-N. In accordance with 802.11 terminology, in this document the AP and the UTs are also referred to as stations or STAs. The techniques and embodiments described herein are also applicable to other types of systems (examples include the cellular standards detailed above). As used herein, the term base station can be used interchangeably with the term access point. The term user terminal can be used interchangeably with the terms user equipment (UE), subscriber unit, subscriber station, access terminal, remote terminal, mobile station, or other corresponding terms known in the art. The term mobile station encompasses fixed wireless applications.

Note also that user terminals 106 may communicate directly with one another. The Direct Link Protocol (DLP), introduced by 802.11(e), allows a STA to forward frames directly to another destination STA within a Basic Service Set (BSS) (controlled by the same AP). In various embodiments, as known in the art, an access point is not required. For example, an Independent BSS (IBSS) may be formed with any combination of STAs. Ad hoc networks of user terminals may be formed which communicate with each other via wireless network 120 using any of the myriad communication formats known in the art.

The AP and the UTs communicate via Wireless Local Area Network (WLAN) 120. In the aspects, WLAN 120 is a high speed MIMO OFDM system. However, WLAN 120 may be any wireless LAN. Optionally, access point 104 communicates with any number of external devices or processes via network 102. Network 102 may be the Internet, an intranet, or any other wired, wireless, or optical network. Connection 110 carries the physical layer signals from the network to the access point 104. Devices or processes may be connected to network 102 or as UTs (or via connections therewith) on WLAN 120. Examples of devices that may be connected to either network 102 or WLAN 120 include phones, Personal Digital Assistants (PDAs), computers of various types (laptops, personal computers, workstations, terminals of any type), video devices such as cameras, camcorders, webcams, and virtually any other type of data device. Processes may include voice, video, data communications, etc. Various data streams may have varying transmission requirements, which may be accommodated by using varying Quality of Service (QoS) techniques.

System 100 may be deployed with a centralized AP 104. All UTs 106 communicate with the AP in one aspects. In an alternate embodiment, direct peer-to-peer communication between two UTs may be accommodated, with modifications to the system, as will be apparent to those of skill in the art, examples of which are illustrated below. Any station may be set up as a designated AP in embodiments supporting designated access points. Access may be managed by an AP, or ad hoc (i.e. contention based).

In one embodiment, AP 104 provides Ethernet adaptation. In this case, an IP router may be deployed in addition to the AP to provide connection to network 102 (details not shown). Ethernet frames may be transferred between the router and the UTs 106 over the WLAN sub-network (detailed below). Ethernet adaptation and connectivity are well known in the art.

In an alternate embodiment, the AP 104 provides IP Adaptation. In this case, the AP acts as a gateway router for the set of connected UTs (details not shown). In this case, IP datagrams may be routed by the AP 104 to and from the UTs 106. IP adaptation and connectivity are well known in the art.

Figure 2:
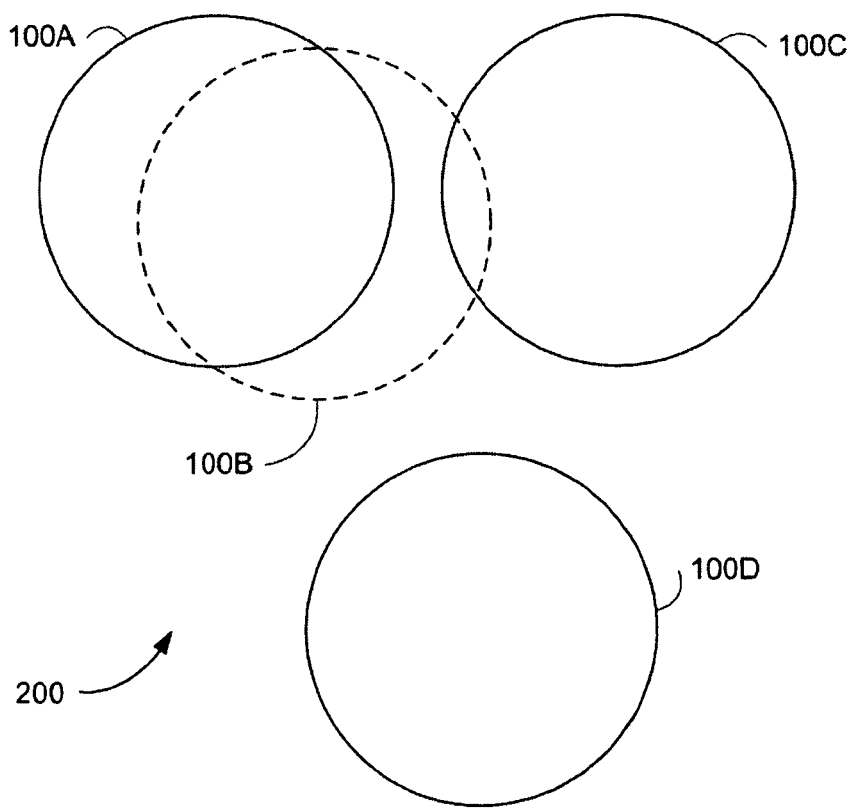
FIG. 2 depicts aspects of a plurality of BSSs located near each other.

FIG. 2 depicts aspects of a plurality 200 of BSSs 100A-100D. In this example, each BSS is located geographically near each other, with interference indicated by overlapping circles. Thus, BSS 100A does not interfere with BSS 100C or 100D. BSS 100B is shown to interfere slightly at the perimeter of BSS 100C, but interferes almost entirely with BSS 100A. In the aspects, unlicensed spectrum is used to deploy various communication systems, such as legacy or high throughput 802.11 systems, described above. Thus, when establishing a new BSS, an access point (or any other device establishing a BSS) may select from any available channel supported by its communication protocol. However, to utilize spectrum more efficiently, BSSs may be established according to various rules, or following other procedures, to minimize the effects of interference with each other. Various aspects described herein illustrate methods for avoiding establishing a BSS in an interfering location, detecting when interference is generated, moving, from one channel to another upon interference detection, and backing off from a higher bandwidth channel to a lower bandwidth channel to avoid interference, among others. As noted above, a given embodiment may comprise any combination of one or more of the aspects described herein.

Figure 3:
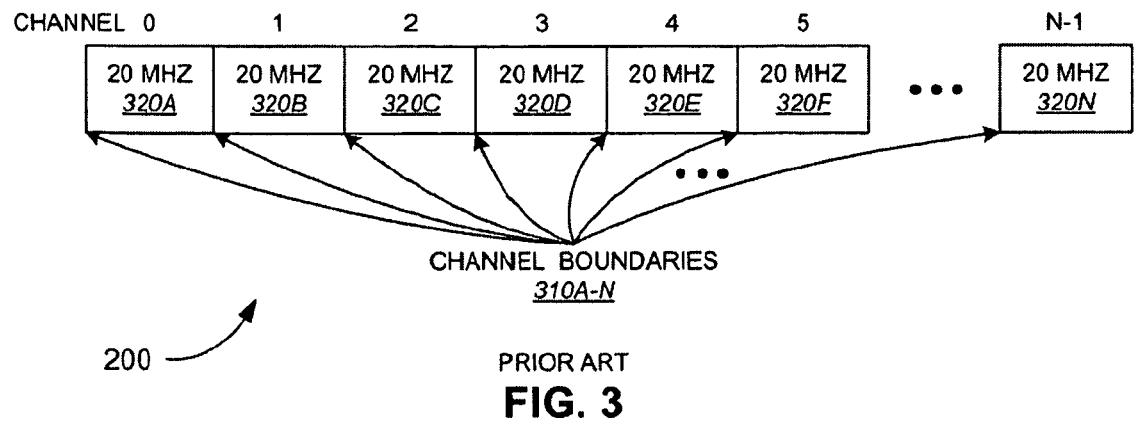
FIG. 3 depicts an example allocation of channels for a system such as legacy 802.11.

FIG. 3 depicts an example allocation of channels for a system such as a legacy 802.11 system, known in the prior art. This channel allocation scheme may be used to deploy a plurality of BSSs 200, such as that described above in FIG. 2. In this example, 20 MHz channels 320A-N are identified contiguously, and assigned the names channel 0 through channel N-1. The channels 320 are separated at channel boundaries 310A-N, respectively. In a legacy 802.11 example, there are 12 channels, 0-11. Each channel 320 has a channel boundary 310 identifying the start of that bandwidth allocation. In aspects, these channel boundaries 310 have been defined in the 802.11 specification.

Figure 4:
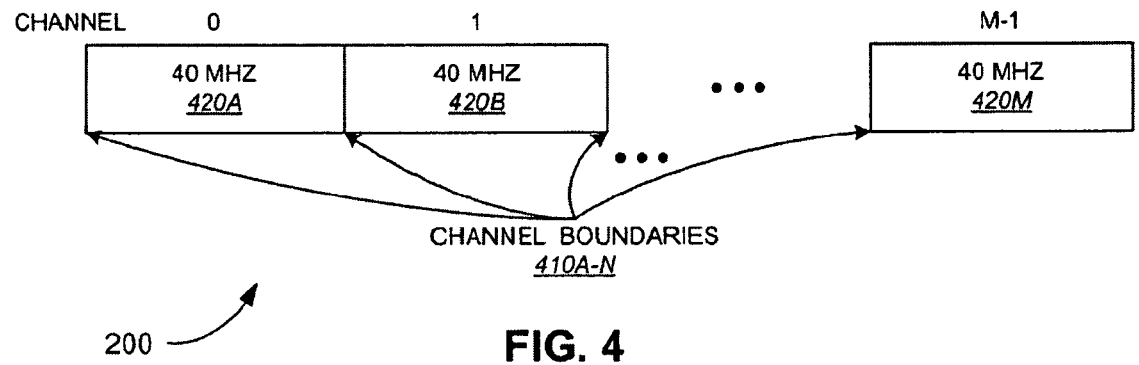
FIG. 4 depicts an example allocation of contiguous high throughput channels located at a subset of legacy channel boundaries.

In one embodiment, in order to occupy spectrum shared among multiple high throughput BSSs in a more efficient manner, the channels are allocated contiguously, as depicted in FIG. 4. In this example, the higher bandwidth channels are allocated 40 MHz, or twice that of a legacy 802.11 channel. In alternate embodiments, other channel boundaries may be used. In this example, the 40 MHz channel boundaries 410A-N indicate the allowable channel boundaries for 40 MHz channels 420A-N, labeled channel 0-(M-1). In this example, the channel boundaries 420 are selected as a subset of the channel boundaries 310.

In an unlicensed spectrum, it may not be possible to mandate that all devices operating therein follow any given set of rules, such as legacy 802.11, high throughput techniques as described above, or as described in the various embodiments detailed herein. However, to the extent that wireless communication devices establish each BSS in accordance with these techniques, the bandwidth may be utilized more efficiently. In this embodiment, the 40 MHz channel boundaries supported are contiguous 40 MHz channels aligned at a subset of the 20 MHz boundaries defined for 802.11. In various embodiments described herein, this aspect may be assumed. However, this contiguous channel allocation, while often beneficial, is not a requirement of embodiments including various other aspects. For example, high throughput channels may be allowed to establish at channel boundaries that potentially overlap with other high throughput channels, and channels are not mandated to be contiguous. Those of skill in the art will recognize when to deploy systems according to this aspect when making tradeoffs between flexibility and optimization of the shared resource.

Figure 5:
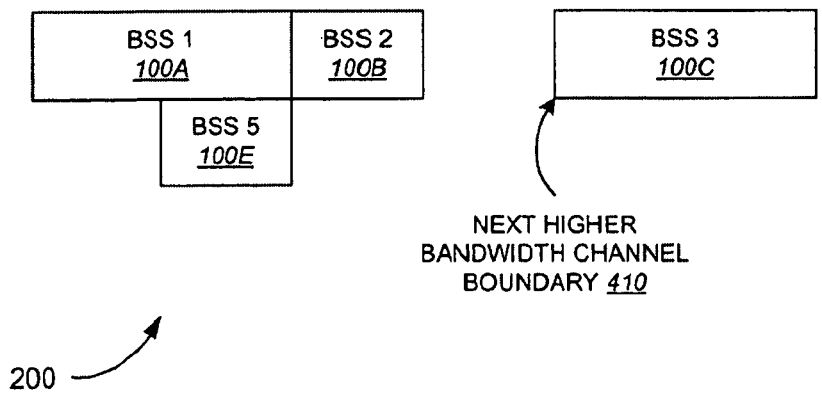
FIG. 5 depicts an example scenario of several established BSSs.

FIG. 5 depicts an example scenario of several established BSSs. In this example, BSS1 100A is established on 40 MHz channel 0 (or 420A, using the channel boundary definitions of FIG. 4). A BSS2 100B is established at the channel boundary adjacent to 100A. In this example, BSS2 is shown operating in 20 MHz. This may be a high throughput system operating in a 20 MHz mode, or may be a legacy 802.11 BSS, or any other BSS operating in less than 40 MHz channel width available at channel boundary 420B. For illustration, assume that a new BSS, BSS3 100C, is to be established requiring a 40 MHz channel allocation. Using various techniques detailed further below, BSS3 will be established at another 40 MHz channel boundary, possibly the next higher 40 MHz channel boundary 410, as shown. In this example, the bandwidth channel boundary is selected in order to avoid interference with any of the existing BSSs, whether legacy or HT.

Also note, as shown in FIG. 5, that BSS5 100E is shown operating in the upper 20 MHz band adjacent to BSS1. In this illustration, assume that BSS5 is established subsequent to the establishment of BSS1. Various techniques for monitoring a BSS, both in the entire bandwidth, as well as subsets of the bandwidth (in this case a primary 20 MHz channel and a secondary 20 MHz channel) are described further below. In this example, BSS1 will monitor and detect the interference generated by BSS5 and may take various measures once the interference is detected. For example, BSS1 may opt to lower its bandwidth to 20 MHz and operate in its primary channel only (illustrated in this example as the portion of channel 420A not overlapped with BSS5). BSS1 may also attempt to locate an alternate available high bandwidth channel 420. It will be clear to one of skill in the art, in light of the teaching herein, that any combination of high and low bandwidth channels may be supported. While, in certain circumstances, the shared medium may be allocated more efficiently when there are no overlapping BSSs, such is not a requirement. Techniques described further below allow for overlapping high throughput BSSs, as well as mixed allocations of high and low bandwidth channels, including interoperation with legacy channels, for example.

An example set of channel pairings is detailed in Table 1. In this example, paired 40 MHz carriers are defined on adjacent carriers numbered $2n$, $2n+1$, as described above. In this example, the primary carrier is an even-numbered carrier. Channel numbers defined in IEEE 802.11a for FCC U-NII bands are shown as channels in the right column and are numbered in multiples of 5 MHz (i.e. Channel number 36 indicates 5000+36*5 MHz). The 40 MHz carriers are paired as $2n$, $2n+1$ as shown in the left column.

TABLE 1

Example HT Channel Pairings

| 40 MHz Carrier Pairs | 802.11 Channel Pairs |
|---|---|
| (0, 1) | 36, 40 |
| (2, 3) | 44, 48 |
| (4, 5) | 52, 56 |
| (6, 7) | 60, 64 |
| (8, 9) | 149, 153 |
| (10, 11) | 157, 161 |

Figure 6:
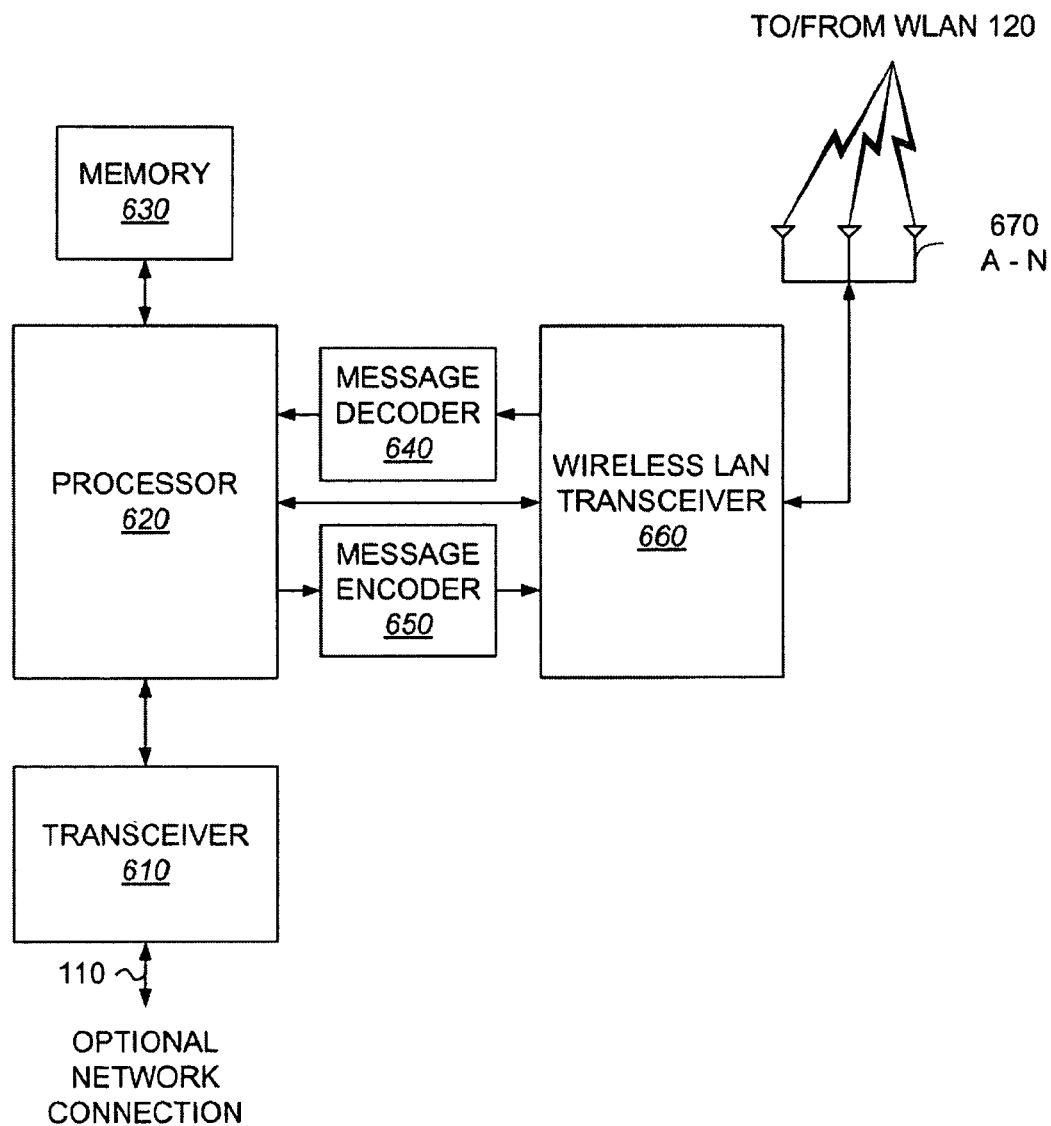
FIG. 6 depicts aspects of a wireless communication device.

FIG. 6 depicts aspects of a wireless communication device, which may be configured as an access point 104 or user terminal 106. A wireless communication device is an example STA, suitable for deployment in system 100. An access point 104 configuration is shown in FIG. 6. Transceiver 610 receives and transmits on connection 110 according to the physical layer requirements of network 102. Data from or to devices or applications connected to network 102 are delivered to processor 620. These data may be referred to herein as flows. Flows may have different characteristics and may require different processing based on the type of application associated with the flow. For example, video or voice may be characterized as low-latency flows (video generally having higher throughput requirements than voice). Many data applications are less sensitive to latency, but may have higher data integrity requirements (i.e., voice may be tolerant of some packet loss, file transfer is generally intolerant of packet loss).

Processor 620 may include a Media Access Control (MAC) processing unit (details not shown) that receives flows and processes them for transmission on the physical layer. Processor 620 may also receive physical layer data and process the data to form packets for outgoing flows. 802.11 WLAN related control and signaling may also be communicated between the AP and the UTs. MAC Protocol Data Units (MPDUs) encapsulated in Physical layer (PHY) Protocol Data Units (PPDUs) are delivered to and received from wireless LAN transceiver 660. An MPDU is also referred to as a frame. When a single MPDU is encapsulated in a single PPDU, sometimes the PPDU may be referred to as a frame. Alternate embodiments may employ any conversion technique, and terminology may vary in alternate embodiments. Feedback corresponding to the various MAC IDs may be returned from the physical layer processor 620 for various purposes. Feedback may comprise any physical layer information, including supportable rates for channels (including multicast as well as unicast traffic/packets), modulation format, and various other parameters.

Processor 620 may be a general-purpose microprocessor, a digital signal processor (DSP), or a special-purpose processor. Processor 620 may be connected with special-purpose hardware to assist in various tasks (details not shown). Various applications may be run on externally connected processors, such as an externally connected computer or over a network connection, may run on an additional processor within wireless communication device 104 or 106 (not shown), or may run on processor 620 itself. Processor 620 is shown connected with memory 630, which may be used for storing data as well as instructions for performing the various procedures and methods described herein. Those of skill in the art will recognize that memory 630 may be comprised of one or more memory components of various types, that may be embedded in whole or in part within processor 620. In addition to storing instructions and data for performing functions described herein, memory 630 may also be used for storing data associated with various queues.

Wireless LAN transceiver 660 may be any type of transceiver. In aspects, wireless LAN transceiver 660 is an OFDM transceiver, which may be operated with a MIMO or MISO interface. OFDM, MIMO, and MISO are known to those of skill in the art. Various example OFDM, MIMO and MISO transceivers are detailed in co-pending U.S. patent application Ser. No. 10/650,295, entitled "FREQUENCY-INDEPENDENT SPATIAL-PROCESSING FOR WIDEBAND MISO AND MIMO SYSTEMS", filed Aug. 27, 2003, and assigned to the assignee of the present application. Alternate embodiments may include SIMO or SISO systems.

Wireless LAN transceiver 660 is shown connected with antennas 670A-N. Any number of antennas may be supported in various embodiments. Antennas 670 may be used to transmit and receive on WLAN 120.

Wireless LAN transceiver 660 may comprise a spatial processor in communication with each of the one or more antennas 670. The spatial processor may process the data for transmission independently for each antenna or jointly process the received signals on all antennas. Examples of the independent processing may be based on channel estimates, feedback from the UT, channel inversion, or a variety of other techniques known in the art. The processing is performed using any of a variety of spatial processing techniques. Various transceivers of this type may transmit utilizing beam forming, beam steering, eigen-steering, or other spatial techniques to increase throughput to and from a given user terminal. In aspects, in which OFDM symbols are transmitted, the spatial processor may comprise sub-spatial processors for processing each of the OFDM sub-carriers (also referred to as tones), or bins.

In an example system, the AP (or any STA, such as a UT) may have N antennas, and an example UT may have M antennas. There are thus M×N paths between the antennas of the AP and the UT. A variety of spatial techniques for improving throughput using these multiple paths are known in the art. In a Space Time Transmit Diversity (STTD) system (also referred to herein as "diversity"), transmission data is formatted and encoded and sent across all the antennas as a single stream of data. With M transmit antennas and N receive antennas there may be MIN (M, N) independent channels that may be formed. Spatial multiplexing exploits these independent paths and may transmit different data on each of the independent paths, to increase the transmission rate.

Various techniques are known for learning or adapting to the characteristics of the channel between the AP and a UT. Unique pilots may be transmitted from each transmit antenna. In this case, the pilots are received at each receive antenna and measured. Channel state information feedback may then be returned to the transmitting device for use in transmission. Eigen decomposition of the measured channel matrix may be performed to determine the channel eigenmodes. An alternate technique, to avoid eigen decomposition of the channel matrix at the receiver, is to use eigen-steering of the pilot and data to simplify spatial processing at the receiver.

Thus, depending on the current channel conditions, varying data rates may be available for transmission to various user terminals throughout the system. The wireless LAN transceiver 670 may determine the supportable rate based on whichever spatial processing is being used for the physical link between the AP and the UT. This information may be fed back for use in MAC processing.

For illustration purposes, message decoder 640 is deployed between wireless LAN transceiver 660 and processor 620. In aspects, the function of message decoder 640 may be performed within processor 620, wireless LAN transceiver 660, other circuitry, or a combination thereof. Message decoder 640 is suitable for decoding any number of control data or signaling messages for performing communications within the system. In one example, message decoder 640 is suitable for receiving and decoding interference report messages, messages to establish, move or reduce bandwidth of a BSS, and others, as described below. Various other messages may be decoded using any number of message decoding techniques well known in the art. Message encoder 650 may be similarly deployed between processor 620 and wireless LAN transceiver 660 (and may also be performed in whole or in part in processor 620, wireless LAN transceiver 660, other circuitry, or a combination thereof), and may perform encoding of messages such as those just described. Techniques for message encoding and decoding are well known to those of ordinary skill in the art.

In one embodiment, a Fast Fourier Transform (FFT) (not shown) may be included to process a received signal to determine the signals received for each tone in an OFDM scenario. The FFT may be followed by more decoding and processing to demodulate data on each of the tones. As described further below, the FFT output may also be used to determine received energy of one or more of the tones for use in monitoring the various channels. FFT processing at the receiver may also be used for this purpose even in the case that the transmitted signals are not OFDM. For example, FFT processing permits low complexity implementation of frequency domain equalization for the reception of wideband CDMA signals as is well known in the art. In aspects, monitoring of the primary and secondary channels may be desired. Alternate embodiments may include additional channels, such as if three or more low bandwidth channel bands are combined to form a high bandwidth channel. These and other modifications will be clear to those of skill in the art in light of the teaching herein.

In one embodiment, a lower bandwidth channel may comprise a first plurality of modulation formats, while a higher bandwidth channel comprises a second plurality of modulation formats, at least one of which is different than the first plurality. For example, a lower bandwidth OFDM channel may have a first number of tones, while the higher bandwidth OFDM channel has a greater number of tones. In alternate embodiment, a lower bandwidth CDMA channel may use a first chip rate, while a higher bandwidth CDMA channel may use a higher chip rate. Those of skill in the art will readily adapt the teaching herein to various higher and lower bandwidth channels, where each channel type supports any number or type of modulation formats.

Figure 7:
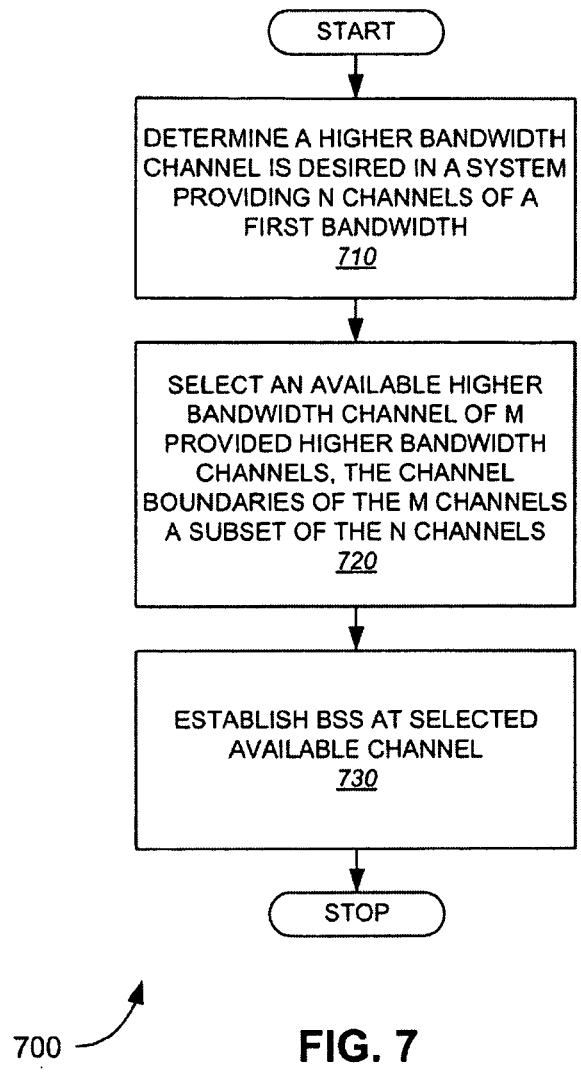
FIG. 7 depicts aspects of a method for establishing a higher bandwidth channel at one of a subset of lower bandwidth channel boundaries.

FIG. 7 depicts aspects of a method 700 for establishing a higher bandwidth channel at one of a subset of lower bandwidth channel boundaries. At 710, a device, such as an access point, determines to establish a higher bandwidth channel BSS. In this example, there are N channels specified of a first bandwidth, an example of which are the twelve 20 MHz channels 320 described above.

At 720, the access point, or other device, selects an available higher bandwidth channel from M provided channels, the channel boundaries of the M channels being a subset of the N channel boundaries. For example, the M channels may be the six 40 MHz channels 420 detailed above.

In one embodiment, an AP or STA attempting to establish an 802.11n BSS or moving to a new carrier conducts Dynamic Frequency Selection (DFS) measurements on all 20 MHz carriers in that band. The AP may use its own DFS measurements when establishing a new BSS and it may also use DFS measurements reported by associated STAs. The algorithm for selecting the 20 MHz or 40 MHz band to establish a BSS may be implementation-dependent. If no free 40 MHz band (even-odd pair of 20 MHz) is found, the AP attempts to find a free 20 MHz band. If no free 20 MHz band can be found, then the AP may establish a BSS with a 20 MHz or 40 MHz carrier. This BSS may overlap with another existing BSS. The AP, in this example, should choose a 20 MHz or 40 MHz band that is "least interfered" so as to cause minimum disruption to an existing BSS. The AP should use its own DFS measurements when establishing a new BSS, and may also use the DFS measurements reported by associated STAs when moving an existing BSS to a new carrier. The algorithm for selecting a 20 MHz or 40 MHz bandwidth to establish a BSS under the non-availability of free carriers may be implementation-dependent.

At 730, the access point, or other device, establishes the BSS at the selected available channel. In the aspects, a mixed BSS is allowed. An AP in 40 MHz BSS mode may accept association of 20 MHz only HT STAS, and may also accept association by 20 MHz legacy 802.11a STAs. In this example, all the 20 MHz STAs are supported on the primary carrier. As detailed above, for 40 MHz transmissions, the extended Preamble including the legacy preamble, legacy SIGNAL field, SIGNAL1 field and extended training fields, are transmitted on both 20 MHz carriers. For 20 MHz HT transmissions, the extended Preamble including the legacy preamble, legacy SIGNAL field, SIGNAL1 field and extended training fields, are transmitted only on the primary carrier. For legacy 20 MHz transmissions, the Preamble and SIGNAL field are transmitted only on the primary carrier. NAV protection may be employed on the secondary carrier. For example, an HT AP (i.e. a 802.11n AP) may attempt to continuously reserve the medium in the secondary carrier by setting NAV, either by using the Contention Free Period (CFP) on a Beacon frame, or through the use of CTS-to-Self and RTS/CTS on the secondary carrier, techniques known in the art.

A new 40 MHz BSS may be established in the presence of an overlapping 40 MHz BSS. If the newly formed 40 MHz BSS is overlapping with an existing 40 MHz BSS, then the AP starting the second or subsequent BSS uses the same primary and secondary carriers as that of the existing 40 MHz BSS. This is ensured by the rule that 40 MHz pairs are of the form $2n$, $2n+1$, without requiring any communication between the APs directly or through STAs within their respective BSSs, in embodiments subscribing to this limitation.

A new BSS may also be established in the presence of overlapping an overlapping 20 MHz BSS. In one embodiment, if establishing a BSS that may overlap with an existing 20 MHz HT BSS or a legacy BSS, the AP establishes a 20 MHz BSS (not 40 MHz). In this case, since the paired 20 MHz carrier is not free (otherwise there would be no need to establish an overlapping BSS), the paired carrier may be occupied by another 20 MHz BSS. Procedures for coordination of medium access in the case of a 40 MHz BSS overlapping with different BSSs conducting independent medium access activity on the two 20 MHz carriers may be too complicated and wasteful, and are not supported in aspects. Those of skill in the art will recognize that reserving a first channel and leaving it dormant while waiting for access on a second channel may not optimize resource utilization. Nonetheless, alternate embodiments may be deployed without this restriction, and additional procedures for attempting to reserve bandwidth on both 20 MHz carriers simultaneously (i.e. contending for access and reserving access on both) may be deployed.

Figure 8:
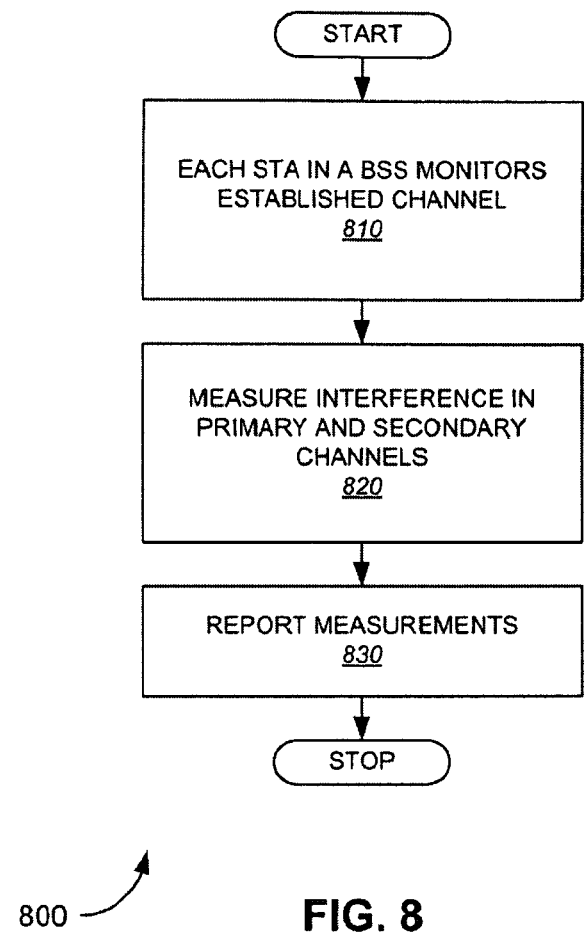
FIG. 8 depicts aspects of a method for monitoring established channels, measuring interference, and reporting those measurements.

FIG. 8 depicts aspects of a method 800 for monitoring established channels, measuring interference, and reporting those measurements. Once a BSS has been established, and one or more STAs are receiving and transmitting on the channel, in order to maintain the allocation of the shared medium with as little interference as possible, one or more of the STAs in a BSS monitor the established channel and may provide associated feedback. While not mandatory, providing feedback from multiple STAs within the BSS may provide benefits. For example, a STA located within a BSS coverage area may receive and detect interference from a neighboring BSS that is not detectable by another STA in the BSS (such as the access point). Thus, at 810, in this example, each STA in a BSS monitors the established channel.

Monitoring the channel may be different depending on the mode selected and the BSS type. In the aspects, there will be a primary and secondary channel forming a 40 MHz higher bandwidth channel, all of which may be used to transmit, or transmission may occur a single 20 MHz channel. Various monitoring techniques are described in further detail below.

At 820, a STA measures interference in the primary and secondary channels. Again, in various modes, the STA may also measure interference on the entire channel, as well. Example measurement embodiments are detailed further below.

At 830, the STA reports measurements, (or receives measurements from other STAs in the example case where an access point will make a decision on whether or not to alter the BSS in response to measured interference). Example reports are described below. Any messaging technique may be used to transmit and receive such measurements.

Figure 9:
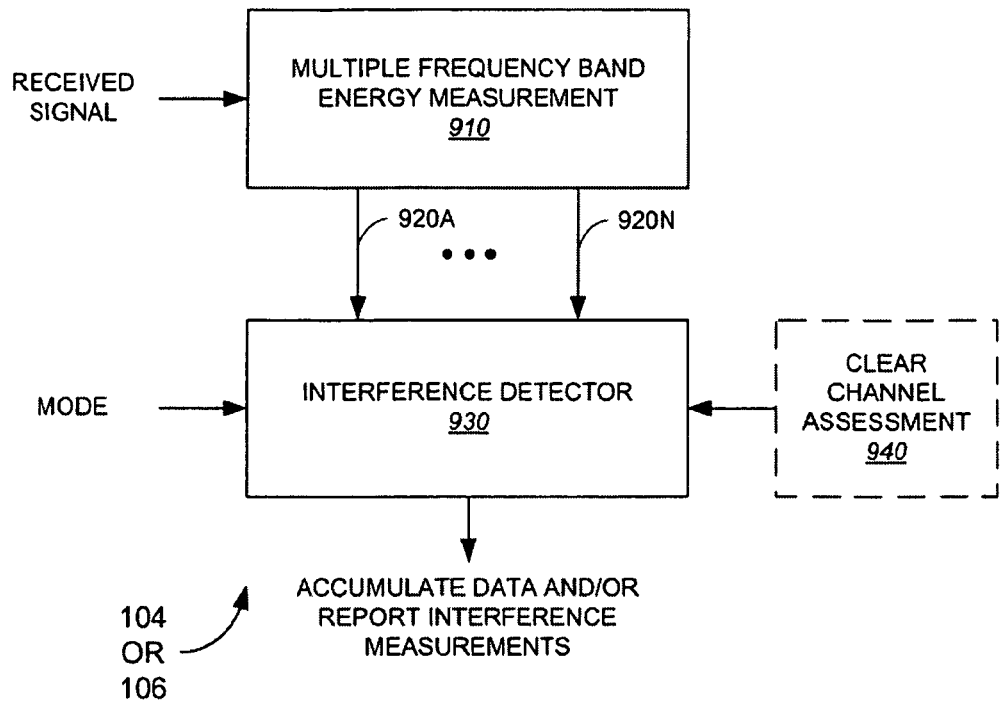
FIG. 9 depicts aspects of a portion of a wireless communication device used for monitoring an established BSS.

FIG. 9 depicts aspects of a portion of a STA 104 or 106 used for monitoring an established BSS. In this example, a received signal is delivered to multiple frequency band energy measurement 910. Energy measurements 920A-920N are generated for two or more frequency bands, and delivered to interference detector 930. Interference detector 930 receives the frequency band energy measurements and makes a determination of whether interference is detected or not. A mode setting may be used to identify the context for which interference detection decisions are made. Example interference detection embodiments are detailed further below.

An optional clear channel assessment 940 is shown connected to interference detector, to indicate that traditional clear channel assessments may be used in conjunction with those described herein. For example, clear channel assessment of an idle 40 MHz channel resulting in an indication that the channel is not being used may be sufficient to determine there is no interference, and multiple frequency band energy measurement may not be required. On the other hand, since it is possible for a lower bandwidth channel to interfere with either the primary or secondary channel, it may be desirable to detect interference on either of those bands in addition to overall interference.

Interference detector 930 accumulates data and/or reports interference measurements. Note that, in aspects, multiple frequency band energy measurement 910 may be a discrete component, or may be a portion of transceiver 660, detailed above. Interference detector 930 may be comprised within wireless LAN transceiver 660, or may be included in whole or in part in processor 620. Those of skill in the art will recognize that the blocks shown in FIG. 9 are illustrative only. Note that the energy measurements 920A-920N may correspond to the available sub-channels of a higher throughput channel, or may be other energy measurements. Energy measurements 920 may be delivered as aggregates of various sub-bands, or energy measurements for sub-bands may be delivered to interference detector 930, which may then aggregate the energy sub-bands to determine the energy measurements within various channels.

Figure 10:
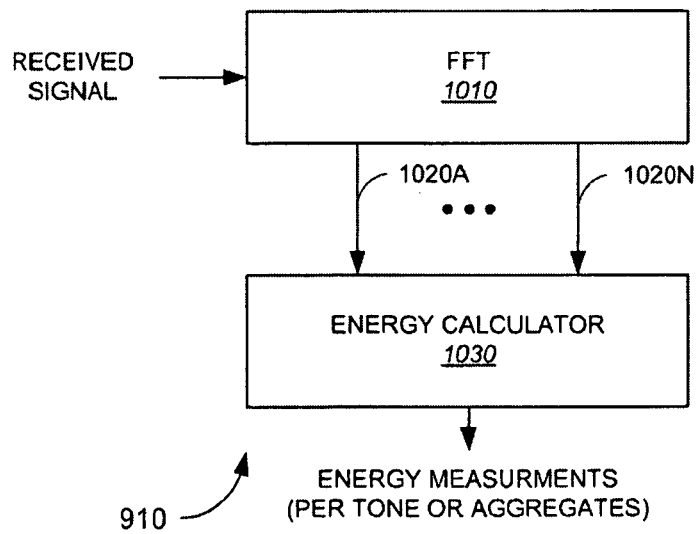
FIG. 10 depicts aspects of multiple frequency band energy measurement block.

FIG. 10 depicts aspects of multiple frequency band energy measurement 910. Those of skill in the art will recognize that various alternate techniques may be deployed in multiple frequency band energy measurement 910. This aspects serves to illustrate the general principals described herein for interference detecting on multiple frequency band wireless networks, and is particularly well suited for the example OFDM wireless LAN described above or other systems where the receivers use frequency domain processing of the received signals. In this example, the receive signal is delivered to a Fast Fourier Transform (FFT) 1010. Various FFT techniques are well known in the art, and any FFT may be deployed in a given embodiment. When used in the OFDM context, FFT 1010 will produce energy measurements 1020A-N for the various OFDM tones or bins. These energy measurements are delivered to energy calculator 1030, which may accumulate the energy for a particular bin or tone or may aggregate energy for a group of tones. This method may also be used with reception of non-OFDM transmissions to obtain the received energy in the group of tones, although the tones are not directly modulated with transmit symbols as in OFDM.

In one example, using a contiguous high throughput channel, as described above, the FFT will produce a plurality of tones. Half of those tones will correspond to the primary channel, and half will correspond to the secondary channel. Thus, energy calculator 1030 may accumulate the energy for the primary channel tones to produce an energy measurement for the primary channel. Similarly, energy calculator 1030 may aggregate the energy for the tones corresponding to the secondary channel to produce a secondary energy measurement.

In alternate embodiments, where the wider channel is not necessarily contiguous, those of skill in the art will recognize that a higher order FFT 1010 may be used to pull out a greater number of tones corresponding to the overall bandwidth in which any portion of the channel may be located. In similar fashion, energy calculator 1030 may select the tones corresponding to the primary and secondary channels (or additional channels, in alternate embodiments), and generate an energy measurement for each frequency band within the multiple frequency band wireless network.

Figure 11:
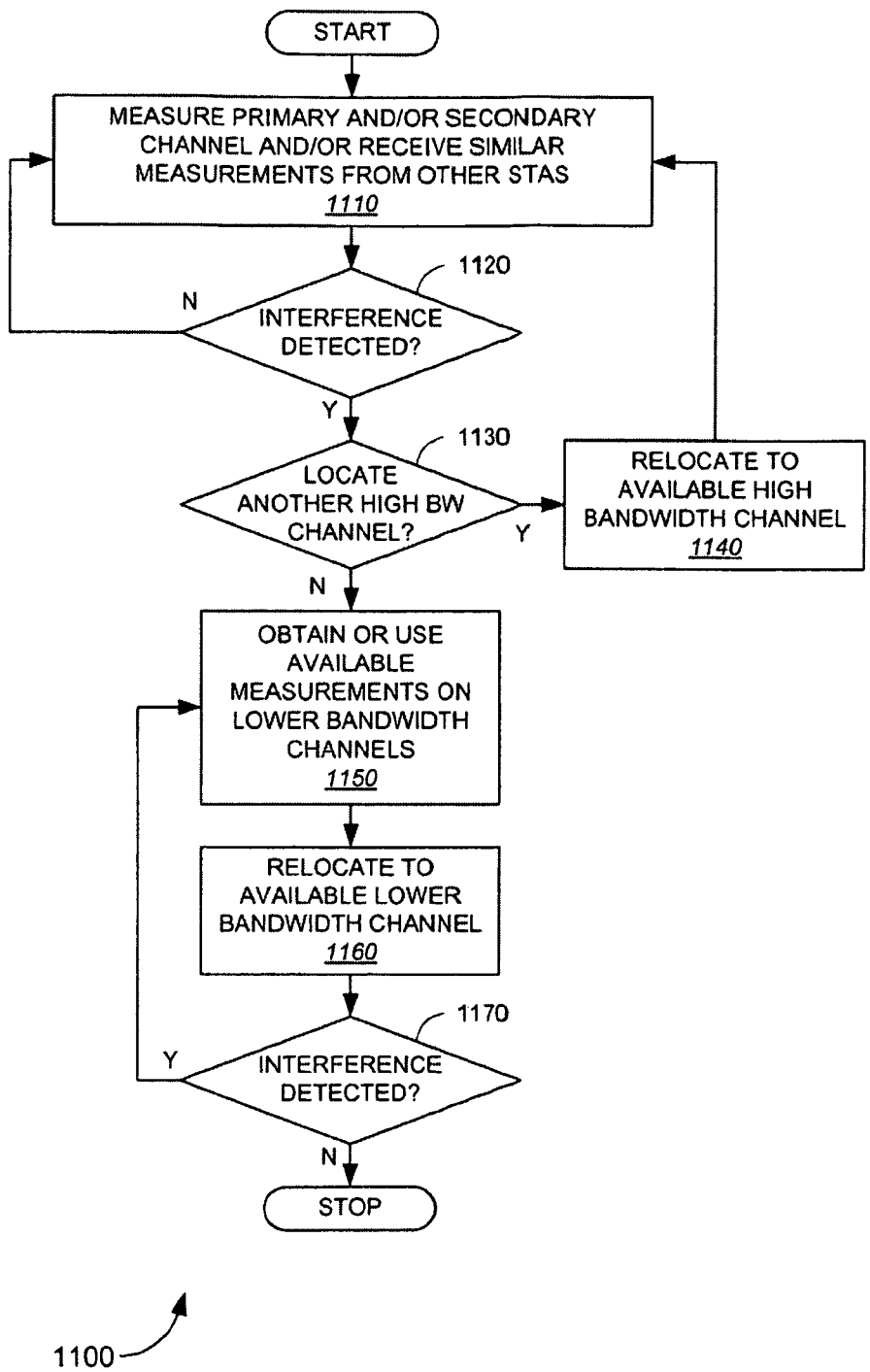
FIG. 11 depicts aspects of a method for modifying a BSS in response to measured interference.

FIG. 11 depicts aspects of a method 1100 for modifying a BSS in response to measured interference. A similar method may also be used for determining an initial channel for establishing a BSS, as described above. Several procedures are detailed in FIG. 11. These procedures are examples only, as various embodiments may employ any one or more of them, and these procedures may also be combined with various other techniques disclosed herein.

At 1110, using any measuring or monitoring techniques, such as those detailed herein, an access point (or other station responsible for allocating a BSS frequency and/or bandwidth) measures the primary and/or secondary channel. Alternatively, or additionally, this STA may receive similar measurements from other STAs in the BSS. At 1120, if no interference is detected, the process returns to 1110, where monitoring may continue. If interference is detected, then the STA may attempt to locate another high bandwidth channel at another location, as shown at 1130. In one embodiment, the STA may look for an unoccupied high bandwidth channel. In another embodiment, the allowing for some interference on the high bandwidth channel, the STA looks for a channel with lower interference than that detected at 1120. If such a channel is located, proceed to 1140 where the STA relocates the BSS to the available high bandwidth channel. Those of skill in the art will recognize various techniques for signaling or messaging to the STAs associated with the BSS that a modification to the channel assignment will be made. Then the process may return to 1110 to continue monitoring at the new high bandwidth channel.

If, at 1130, another high bandwidth channel is not available, at 1150, use available measurements on lower bandwidth channels or obtain such measurements from STAs. At 1160, drop back to a lower bandwidth channel. In the aspects, this entails reducing from a 40 MHz channel to a 20 MHz channel. The BSS may be relocated to either the primary or secondary channel, depending on the type of interference detected. Once the BSS has been relocated and operating on the lower bandwidth channel, then, at 1170, determine if interference is still detected on that channel. If interference is detected, the process reverts to 1150 and then 1160 to obtain measurements and relocate the BSS to an alternate available low bandwidth channel, if one is available.

If, at 1170, there is no further interference detected, the process may stop. Note that a method 1100 may be iterated indefinitely to continue monitoring the channels on which the BSS operates. This allows a higher bandwidth capable access point and STAs to continue monitoring high bandwidth channels even while the BSS is operating on a low bandwidth channel and to relocate to a high bandwidth channel when one becomes available.

Figure 12:
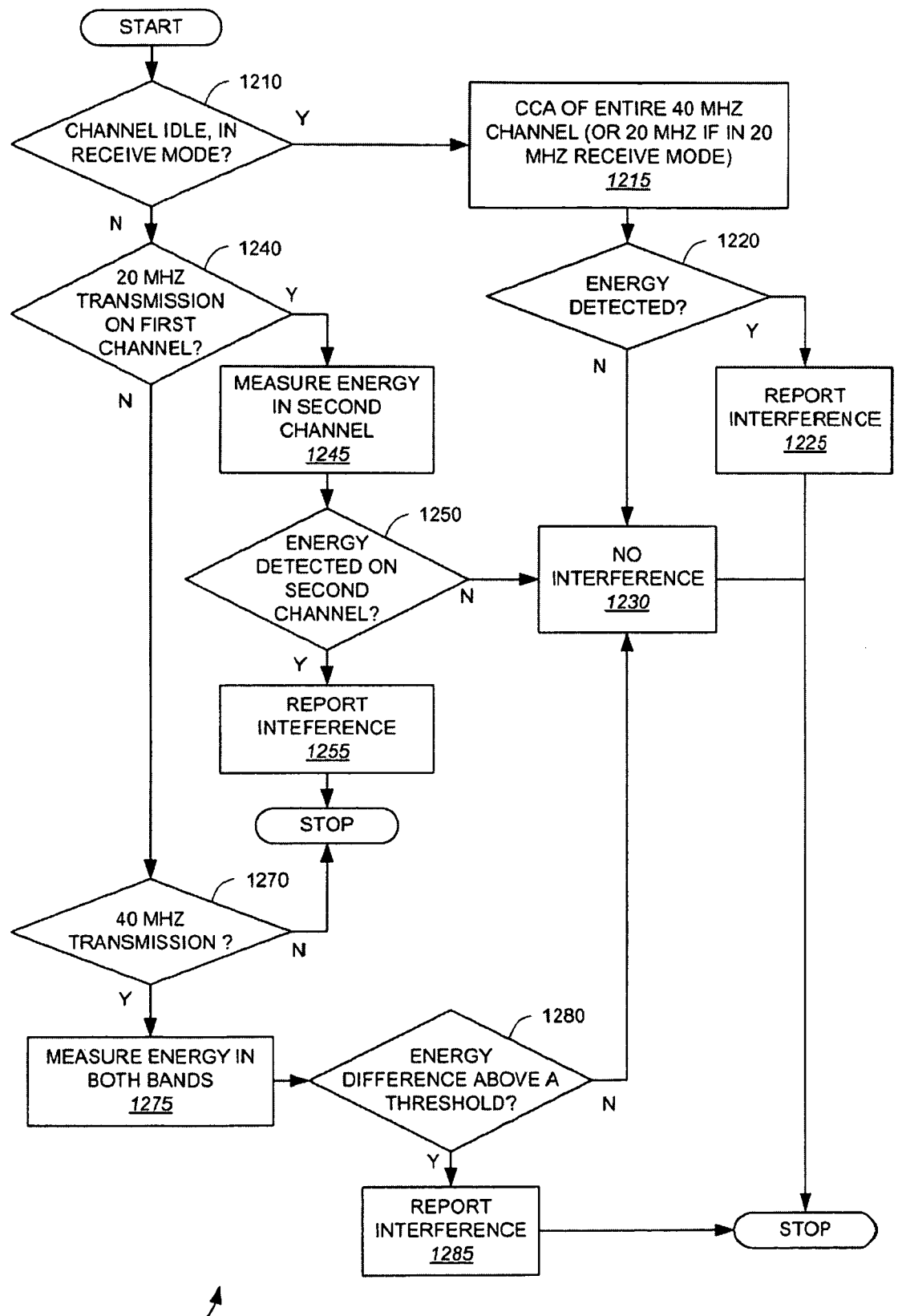
FIG. 12 depicts aspects of a method for determining if interference is occurring on a multiple frequency band wireless network.

FIG. 12 depicts aspects of a method 1200 for determining if interference is occurring on a multiple frequency band wireless network. The various embodiments detailed herein have been described in a Carrier Sense Multiple Access/Collision Avoidance (CSMA/CA) context. In other words, each STA listens to the shared medium before transmitting. Thus, each STA must be able to determine if the channel is free before attempting to transmit.

Because the multiple frequency band WLAN is occupying more than one band, and other STAs such as a legacy BSS may begin to transmit on either the primary or secondary channels, the STAs supporting the high bandwidth network need to be able to monitor both the primary and secondary channels (as well as additional channels, if supported). While it is possible to deploy two full receive chains to dedicate to monitoring both the primary and secondary channel, for example in 20 MHz mode, that may be prohibitively expensive for a given embodiment. As detailed herein, and described above with respect to FIGS. 9 and 10, it is not necessary to deploy a full receive chain on both channels to determine whether or not there is interference. The method 1200 detailed in FIG. 12 may be used with an embodiment such as shown in FIG. 9 or FIG. 10, as well as any other means for detecting interference on the various channels known in the art.

Several example modes are illustrated in FIG. 12. In one example, the channel (whether high or low bandwidth) is idle and the STA monitoring that channel is able to receive and monitor, expecting to find the channel idle. In another example, the channel is active, in a mixed BSS mode (i.e. one or more STAs in the BSS operate at a lower bandwidth than a maximum supported by the BSS, such as a 20 MHz transmission within a 40 MHz bandwidth channel). A third example is when a transmission is active using a high bandwidth channel (i.e. a 40 MHz transmission in the aspects).

In describing the method of FIG. 1200, the aspects 20 and 40 MHz channels will be used. Those of skill in the art will recognize that any size channels may be deployed for relatively lower and relatively higher bandwidth systems, as well as channels additional to the primary and secondary. At 1210, if the channel is idle, and the monitoring STA is in receive mode, proceed to 1215. At 1215, a Clear Channel Assessment (CCA) of the entire 40 MHz channel, or the 20 MHz channel if in 20 MHz receive mode, is performed. In this example, the entire channel is expected to be idle, so any energy detected (above a threshold, for example), as indicated at 1220, may be used to determine there has been interference. If energy is detected, then an interference report may be generated or interference event statistics may be updated at 1225 and the process may stop. Various example interference reports are detailed below. If no energy is detected during the clear channel assessment, then there is no interference detected at 1230, and the process may stop.

If, at 1210, the channel is not idle, then, at 1240, determine if there is a 20 MHz transmission on a first channel (such as the primary channel, for example). If so, measure the energy in the second channel at 1245. Note that, before any transmission, a clear channel assessment must be made for the 20 MHz transmission on the first channel. Again, as described above, an entire receive chain is not required to measure the energy in a second channel, even while receiving on the first channel. For example, in a receiver using frequency domain processing, an FFT may be deployed to measure energy at the various tones. When 20 MHZ transmissions is being used, the energy of the tones not used in that 20 MHZ transmission may be measured. At 1250, if energy is detected on the second channel, then interference on the second channel has been detected. At 1255, an interference report may be generated or interference event statistics may be updated or other appropriate action taken. If energy is not detected on the second channel, then, as before, proceed to 1230. At 1230, no interference has been detected and the process may stop.

If the channel is not in idle mode and the transmission is not a 20 MHz transmission, then, if a 40 MHz transmission is to transpire, at 1270, proceed to 1275. At 1275, measure energy in both bands. In this example, the three conditions to be tested have been illustrated, and the process proceeds to 1270 to stop if this is not a 40 MHz transmission. In an alternate embodiment additional scenarios may be tested in alternate embodiments. At 1280, an energy difference is computed between the measured energy from both bands. If the energy difference meets certain criteria (exceeding a threshold, for example) then interference is reported at 1285. If not, the process may stop. Measuring an energy difference between the two bands (or additional bands, in an alternate embodiment) is a useful when the 40 MHz transmission is conducted using approximately the same energy across the available bandwidth. Then, if an alternate BSS is interfering on either the primary or the secondary channel, then the additional energy would be measured on the respective channel. In this case, there would then be a detected energy difference between the two bands.

Note that the interference report generated at 1225, 1255 or 1285 may be used to generate a report for transmission to a remote STA for use in modifying the BSS, or alternate steps may take place. For example, various counters tabulating interference types may be incremented, and/or a report generated, when certain criteria (such as exceeding a threshold) are met. Alternately, the various reports may be identical and a single report of interference or not interference may be made.

Figure 13:
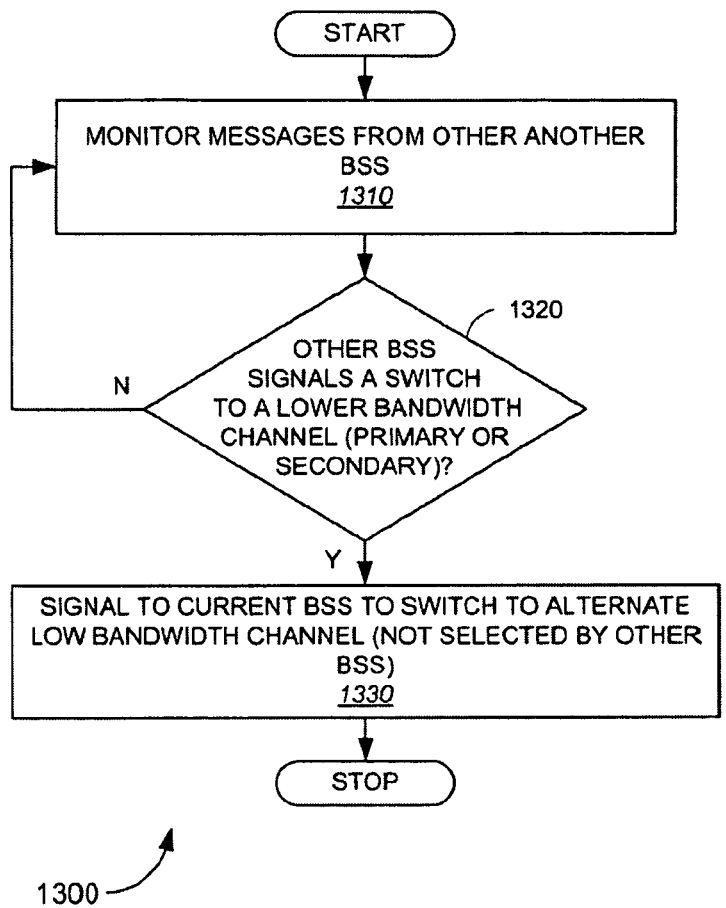
FIG. 13 depicts aspects of a method 1300 for responding to BSS modification messages from an alternate BSS.

FIG. 13 depicts aspects of a method 1300 for responding to BSS modification messages from an alternate BSS. In this example, at 1310, a STA monitors messages from another BSS. For example, interference may have been detected. Or, the alternate BSS may be using a communication protocol that is decodable by the STA employing the method. The STA may decode messages directed to STAs in the alternate BSS, and may make decisions for maintaining its BSS accordingly. At 1320, if the other BSS signals a switch to a lower bandwidth channel (such as the primary or secondary channel), perhaps due to interference detection at that BSS, proceed to 1330. If no such message is received, the process returns to 1310 and monitoring may continue. If such a message or signal is detected in an alternate BSS, then the access point (or other device capable of signaling a BSS change) may signal to the current BSS to switch to an alternate low bandwidth channel, at 1330. The alternate low bandwidth channel selected would most conveniently be a channel not selected by the other BSS from which the signal was received. For example, if a signal from the alternate BSS to STAs within that BSS is to switch to the secondary channel, then the current BSS may switch to the primary channel, and vice versa. In some instances, if both BSSs measure interference at the same time and send messages to their respective STAs to switch to the primary or secondary channel at the same time, then both BSSs may switch to the same lower bandwidth channel. In such a case, both BSSs would again detect interference. Additional back-off schemes may be deployed in such circumstances to avoid such a situation, or other techniques may be deployed. In due course, the likelihood is that both BSSs, perhaps following a method such as described above with respect to FIG. 11, would locate alternate channels on which to communicate without interference.

Aspects illustrating various monitoring and BSS frequency modification techniques is described below. Example report types are also described. Those of skill in the art will recognize myriad variations in light of the teaching herein. In a 40 MHz BSS STAs access the medium using CSMA/CA procedures on the primary carrier. If interference on the secondary carrier is detected during back-off, the STA should transmit on the primary carrier only.

During back-off, as well as during any 20 MHz reception on the primary carrier in the 40 MHz BSS, 40 MHz capable STAs that are awake perform CCA on the secondary carrier. When interference is detected on the secondary carrier or when a preamble is detected on the secondary carrier, the STA increments a Secondary Carrier Interference Event (SCIE) counter.

Alternately, each STA may maintain and report multiple interference event counters for each possible interference event type. Examples include: (i) Detected preambles, (ii) Detected frames with a different SSID, (iii) Detected noise level above a threshold, or (iv) Detected interference from other sources.

SNR degradation may be measured on the secondary carrier. During reception of 40 MHz transmissions, STAs may compute the difference in SNR between the primary and secondary carriers, as described above. The increased interference on the secondary carrier may come from a 20 MHz (or legacy) BSS that may not be capable of DFS. If the difference exceeds a threshold, the STA increments the appropriate SCIE counter.

SCIE reports may be generated. In an example infrastructure BSS, STAs may autonomously, or on request from the AP, report the SCIE Counter value (or multiple SCIE counter values for the various interference types). The SCIE Counter is reset once the AP acknowledges the report. The AP action on the receipt of SCIE Reports may be implementation-dependent, examples are detailed above. The AP should transition the BSS to 20 MHz operation if the SCIE counts are excessive (or find an alternate high bandwidth channel). A transition to 20 MHz may be announced by the STA transmitting the Beacon.

When excessive SCIE counts are present (whether measured, reported, or both), the AP stops use of the secondary carrier. The AP may request other STAs in the BSS to make additional measurements. The AP may move to another 40 MHz carrier or transition to 20 MHz operation on the primary carrier and terminate use of the secondary carrier, as described above.

A mandatory switch to 20 MHz may be deployed in some embodiments, using techniques similar to that shown in FIG. 13. In a 40 MHz overlapping BSS, when the AP observes that the SCIE Counts are low, and there is excessive activity from an overlapping BSS on the primary carrier, the AP may transition the BSS to 20 MHz operation on the secondary carrier. An AP (in another 40 MHz BSS) that receives a Beacon from the overlapping BSS, announcing the transition to 20 MHz operation on the secondary carrier, transitions to 20 MHz operation on the primary carrier and indicates this information in subsequent beacons using 802.11b mechanisms.

Multiple overlapping BSSs may be supported. When multiple overlapping BSSs are present, DFS procedures may be deployed to gain access to the channel. In some cases, the result will be overlapping 20 MHz BSS as in existing 802.11.

Detailed below are example procedures for establishing 40/20 MHz BSS in a new band, or relocating to another new band. A transceiver may be deployed in accordance with the following requirements.

The transceiver will transmit on the primary channel if the secondary is busy. During 40 MHz operation, the transceiver conducts clear channel assessment (CCA) on both 20 MHz carriers, as described above. It follows medium access rules on the primary 20 MHz carrier. When the STA determines that it has permission to access the medium according to the CSMA/CA rules on the primary channel, and if the STA determines that the medium is busy on the secondary channel, the STA transmits on the 20 MHz primary carrier only.

For 40 MHz transmissions, the preamble and legacy SIGNAL are transmitted on both carriers. The SIGNAL field indicates whether the MIMO training and data are transmitted on 40 MHz or on the 20 MHz primary carrier only.

Reception may be made on both the primary and secondary channels, or the primary only. In a 40 MHz BSS, a 40 MHz transceiver listens for CCA on both carriers. The receiver is able to detect a preamble and decode the legacy signal field either on the primary carrier or on both carriers. When CCA declares detected energy on the medium, the receiver is able to test all of the following hypotheses: (i) signal (preamble) on primary, idle on secondary; (ii) signal on the primary and secondary; and (iii) signal on primary and interference on the secondary. Depending on the result of these measurements, as well as indication in the SIGNAL field, the receiver is capable of decoding a 20 MHz transmission on the primary carrier, or a 40 MHz transmission spanning the two carriers.

As described above, during reception on the secondary carrier when the medium is idle, when there is a 20 MHz transmission on the primary, or when there is a 40 MHz transmission on both carriers, the receiver is able to detect interference on the secondary carrier. A number of methods may be used to detect interference on the secondary carrier (for example, as described above with respect to FIG. 12). When the medium is idle, the STA may detect the presence of transmission from another BSS (indicated by the presence of a different SSID in the MAC header of the transmission). When the medium is busy with a 20 MHz transmission, energy detected on the secondary carrier indicates interference. When the medium is busy with a 40 MHz transmission, a STA may determine an SNR metric that indicates a difference in SNR on the two carriers. The STA collects and reports these information events as detailed above.

Examples of permitted carriers in overlapping BSSs with 40 MHz operation for this aspects are detailed in Table 2. Note that permitted and non-permitted overlapping BSS scenarios are specific to this embodiment. As described above, alternate embodiments may allow or disallow any combination of various overlap types.

TABLE 2

Examples of Permitted Carriers in Overlapping BSS with 40 MHz Operation

| Overlapping BSS 1 | Overlapping BSS 2 | Overlapping BSS 3 | Permitted | Comment |
|---|---|---|---|---|
| 40 MHz: 2n, 2n + 1 | 40 MHz: 2n, 2n + 1 | Not present | Yes | Overlapping 40 MHz BSS. Either BSS may announce a switch to 20 MHz. The other one must then switch to other 20 MHz carrier. |
| 40 MHz: 2n, 2n + 1 | 40 MHz: 2n + 1, 2n + 2 | Not present | No | 40 MHz carriers must be of the form 2n, 2n + 1 |
| 40 MHz: 2n, 2n + 1 | 20 MHz: 2n | Not present | Yes | Overlap with 20 MHz on Primary carrier. |
| 40 MHz: 2n, 2n + 1 | 20 MHz: 2n + 1 | Not present | No | BSS 1 must switch to 20 MHz operation on either 2n or 2n + 1. Or find an alternate 40 MHz carrier. |
| 40 MHz: 2n, 2n + 1 | 20 MHz: 2n | 20 MHz: 2n + 1 | No | BSS 1 must switch to 20 MHz operation on either 2n or 2n + 1. Or find an alternate 40 MHz carrier. |
| 40 MHz: 2n, 2n + 1 | 20 MHz: 2n | 20 MHz: 2n | Yes | Overlap with 20 MHz on Primary carrier. |

The following are several additional examples of techniques that may be used when detecting Secondary Carrier Interference Events. If, during CCA on the primary, there is a transmission on the secondary, it must be interference. In one embodiment, there is no need to decode the BSS ID. During reception of a 40 MHz transmission, if there is a lower SNR on the secondary, then it may be concluded to be interference. If, during a 20 MHz transmission, there is energy on the secondary, then it must be interference. In these instances, therefore, it is not necessary to decode the BSS ID from transmissions on the secondary to determine that there is interference on the secondary carrier. This is useful when, for example, there is energy on the secondary carrier, and the data rate and steering may be such that the interfered STA is unable to decode the MAC header of the interfering transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus comprising:
   a receiver configured to receive a signal on a shared channel comprising at least a primary channel and a secondary channel;
   an energy calculator configured to calculate an energy measurement of a plurality of tones of the primary channel and an energy measurement of a plurality of tones of the secondary channel and to compute an energy difference between the energy measurement of the primary channel and the energy measurement of the secondary channel, wherein calculating the energy measurement of the plurality of tones of the primary channel comprises aggregating the energy of the plurality of tones of the primary channel and wherein calculating the energy measurement of the plurality of tones of the secondary channel comprises aggregating the energy of the plurality of tones of the secondary channel; and
   a processor configured to detect interference in response to the energy measurement of the primary channel and the energy measurement of the secondary channel, wherein detecting interference comprises determining interference in a second mode, in which transmission is expected on the primary channel and the secondary channel, when the computed energy difference is above an energy difference threshold.

2. The apparatus of claim 1, further comprising an FFT with an input and an output, the input configured to receive the received signal, and the output coupled to the energy calculator.

3. The apparatus of claim 1, further comprising a message encoder for generating an interference report message in response to detected interference.

4. An apparatus, operable with a shared channel comprising at least a primary channel and a secondary channel, comprising:
   means for measuring energy of a plurality of tones of the primary channel, wherein measuring the energy of the plurality of tones of the primary channel comprises aggregating the energy of the plurality of tones of the primary channel;
   means for measuring energy of a plurality of tones of the secondary channel, wherein measuring the energy of the plurality of tones of the secondary channel comprises aggregating the energy of the plurality of tones of the secondary channel;
   means for computing an energy difference between the measured energy of the primary channel and the measured energy of the secondary channel; and
   means for determining interference in accordance with the measured energy of the primary channel and the measured energy of the secondary channel, wherein the means for determining interference comprises means for determining interference in a second mode, in which transmission is expected on the primary channel and the secondary channel, when the computed energy difference is above an energy difference threshold.

5. In a Carrier Sense Multiple Access/Collision Avoidance system, supporting transmission on a shared channel comprising at least a primary channel and a secondary channel, a method comprising:
   measuring energy of a plurality of tones of the primary channel, wherein measuring the energy of the plurality of tones of the primary channel comprises aggregating the energy of the plurality of tones of the primary channel;
   measuring energy of a plurality of tones of the secondary channel, wherein measuring the energy of the plurality of tones of the secondary channel comprises aggregating the energy of the plurality of tones of the secondary channel;
   computing an energy difference between the measured energy of the primary channel and the measured energy of the secondary channel; and
   determining interference in accordance with the measured energy of the primary channel and the measured energy of the secondary channel, wherein determining interference comprises determining interference in a second mode, in which transmission is expected on the primary channel and the secondary channel, when the computed energy difference is above an energy difference threshold.

6. The method of claim 5, further comprising:
   performing a Fast Fourier Transform (FFT) of the shared channel to produce a plurality of energy measurements for a corresponding plurality of tones; and wherein:
   the energy of the primary channel is measured in accordance with a first subset of the plurality of energy measurements; and
   the energy of the secondary channel is measured in accordance with a second subset of the plurality of energy measurements.

7. The method of claim 5, wherein determining interference comprises determining interference in a first mode, in which transmission is expected on the primary channel only, when the measured energy of the secondary channel is above a secondary channel energy threshold.

8. The method of claim 5, wherein determining interference comprises determining interference in a third mode, in which no transmission is expected on the primary channel or secondary channel, when either the measured energy of the primary channel or the measured energy of the secondary channel is above an idle channel energy threshold.

9. The method of claim 5, further comprising incrementing an interference counter value when interference is determined.

10. The method of claim 5, further comprising generating an interference report message in accordance with determined interference.

11. The method of claim 5, further comprising modifying a channel parameter when determined interference meets predefined criteria.

12. The method of claim 11, wherein modifying a channel parameter comprises reducing the bandwidth of the channel to the bandwidth of the primary channel.

13. The method of claim 11, wherein modifying a channel parameter comprises reducing the bandwidth of the channel to the bandwidth of the secondary channel.

14. The method of claim 11, wherein modifying a channel parameter comprises changing a frequency carrier of the channel.

* * * * *